United States Patent [19]

Mandella et al.

[11] Patent Number: 4,758,633
[45] Date of Patent: Jul. 19, 1988

[54] INSOLUBLE VINYL LACTAM CLARIFIERS

[75] Inventors: William L. Mandella, Boonton; Eugene V. Hort, Cliffside Park, both of N.J.

[73] Assignee: GAF Corporation, Wayne, N.J.

[21] Appl. No.: 23,317

[22] Filed: Mar. 9, 1987

[51] Int. Cl.[4] .............................................. C08F 8/06
[52] U.S. Cl. .................................... 525/388; 210/649
[58] Field of Search .......................................... 525/388

[56] References Cited

FOREIGN PATENT DOCUMENTS 883791 12/1961 United Kingdom .

Primary Examiner—Christopher Henderson
Attorney, Agent, or Firm—Marilyn J. Maue; Joshua J. Ward

[57] ABSTRACT

The invention relates to highly filterable polyvinyl polypyrrolidone particles and to the process for improving filterability of standard polyvinyl polypyrrolidone granules which comprises treating granular polyvinyl polypyrrolidone, containing a minor amount of non-cross-linked and/or unsaturated sites and having a number average molecular weight greater than 100,000, with ozone at a temperature selected from within the ranges consisting of from about −15° C. to 35° C. and from 85° C. to about 150° C. and collecting the ozone treated product, which has a flow rate index (FRI) increased by at least 25%.

9 Claims, 1 Drawing Sheet

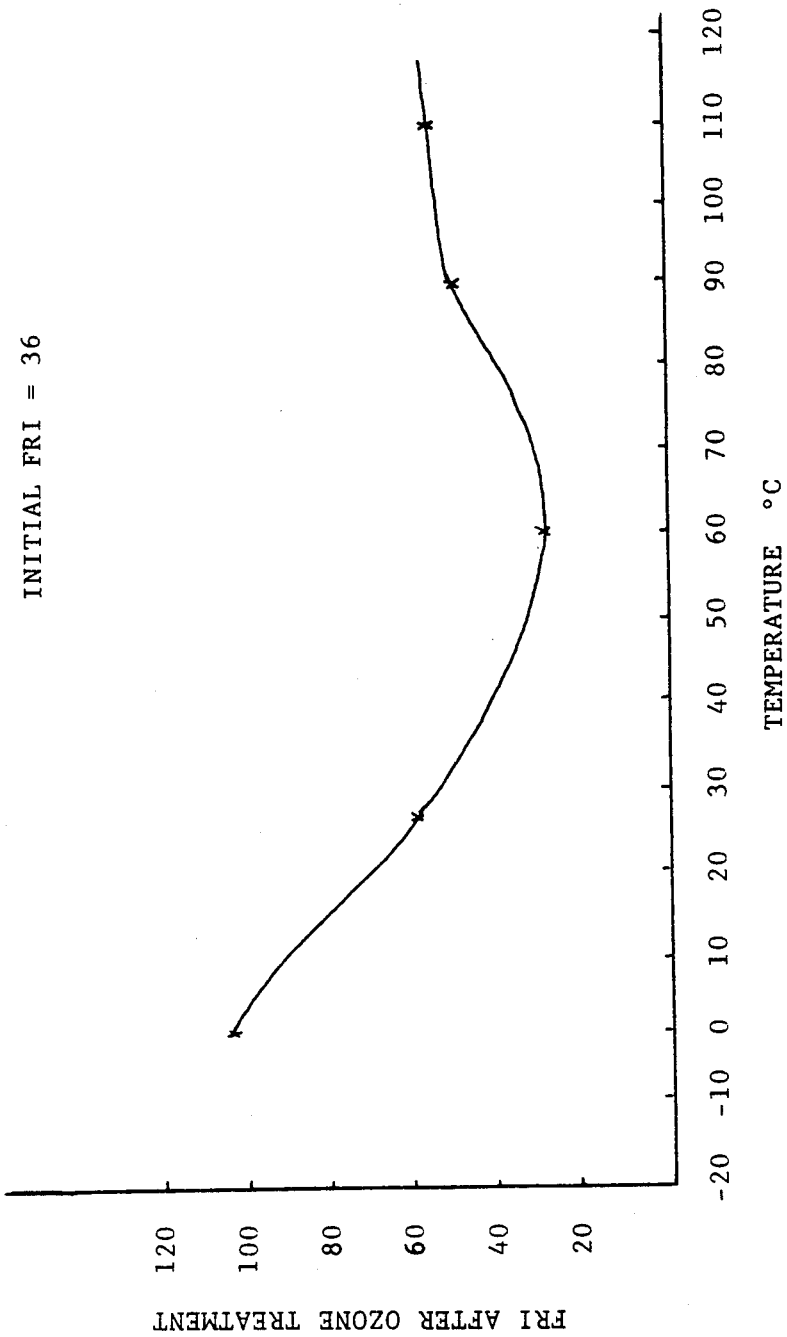

INSOLUBLE VINYL LACTAM CLARIFIERS

In one aspect, the invention relates to an improved filterable polyvinyl polylactam in a high state or purity and in another aspect, to the process which provides improved filterability of polyvinyl polylactam particles.

Water insoluble polyvinyl polypyrrolidone is a well known filtration aid for various substances, particularly, beer and other beverages and is used to remove tannin type compounds and to improve beverage clarity. These polymers form insoluble complexes with polyphenolic structures of the type commonly referred to as tannins in beer, wine, vinegar and many fruit and vegetable beverages. It is the function of the polyvinyl polypyrrolidone to act as a filter aid for the colloidal stabilization of beer and in the stabilization of color values in wines, particularly white and rosé wines, and vinegar. While filtration of beverages using polyvinyl polypyrrolidone is very effective, problems have occurred which are primarily associated with the low flow rate index (FRI) of some polymers currently in use. This problem is aggravated when these polymers are regenerated for reuse. Additionally, traces of non-volatile water soluble components (NVWS) such as inorganics, unreacted monomer, and vinylpyrrolidone oligomers from the polyvinyl polypyrrolidone are found in the filtrate. These components are not easily removed by filtration and are therefore objectionable.

Accordingly, it is an object of this invention to significantly improve the FRI of polyvinyl polylactam granules by an economical and commercially feasible process.

Another object is to provide a polyvinyl polypyrrolidone clarifying agent having a high FRI while maintaining a low NVWS level.

Another object is to increase the hardness of relatively soft water swellable polyvinyl polypyrrolidone particles so as to prevent agglomeration or plugging of pores of a filter.

Still another object is to provide a highly filterable polyvinyl polypyrrolidone clarifying agent.

Yet another object is to provide a filtration agent for non-comestible materials in which water solubles of the type originating in the polyvinyl polylactams are not objectionable.

These and other objects of the invention will become apparent from the following description and disclosure.

According to this invention, a particulate, water insoluble vinyl lactam polymer, having a molecular weight greater than 100,000, an average particle size sufficient to be retained on a filtering means, is treated with ozone at a temperature selected from within the ranges consisting of from −15° C. to 35° C., and from 85° C. to about 150° C. under a pressure of from about 1 psig. to about 200 psig. for a period of at least 0.1 hour, e.g. from about 0.1 to about 48 hours. These operating conditions are interrelated, such that time and temperature are, for the most part, inversely proportional. Preferred conditions for effecting the ozone treatment of the vinyl lactam polymers include temperature within the selected ranges of from about −5° C. to about 30° C., and from about 88° C. to about 100° C. under between about 5 and about 50 psig. for a period of from about 1 to 20 hours.

The ozone used in the process of this invention can be generated from any convenient source such as, for example, a micro-ozonizer, electrical discharge equipment. UV irradiation of air or oxygen, electrolysis of water, etc. The polyvinylpolylactam particles are continuously contacted with the ozone gas, e.g. by bubbling gas through a bed of the polymer in an open system, at a flow rate of between about 2 and about 40 milliequivalents/hour/Kg of sample, preferably between about 4 and about 24 milliequivalents/hour/Kg of sample at a temperature selected from the above critical ranges.

The vinyl lactam polymer can also be treated in a sealed vessel at the above temperatures and pressure. In this operation, the amount of ozone employed is between about 5 and about 200 milliequivalents/Kg of polymer sample, preferably between 10 and about 100 milliequivalents/Kg of sample.

The vinyl lactam polymers of this invention are described as "popcorn" polymers* and are comprised of one or more vinyl lactam monomers or a vinyl lactam monomer copolymerized with a minor amount, more desirably less than 30%, of a comonomer such as hydroxylated alkyl acrylate or methacrylate comonomer. Homopolymers of this type, particularly the polyvinyl polypyrrolidones, are preferred.

*See Advances in Chemistry Series No. 128, Published by American Chemical Society, 1973, Chapter 7, entitled "Popcorn Polymers" by J. W. Breitenback and H. Axmann, pages 110–124.

The polyvinyl lactam homopolymes of this invention are defined by the insoluble polymers of lactam monomers having the formula

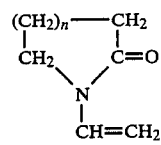

wherein n is an integer having a value of from 1 to 3. These polymeric materials can be treated in a dry state or as a wet cake containing not more than 10% liquid.

The polyvinyl lactam, preferably polyvinyl polypyrrolidone, contains a minor amount of non-crosslinked and/or unsaturated sites in the high molecular weight polymer chains. Of these, polyvinyl polypyrrolidones having an average molecular weight greater than 100,000 and having less than 10% by weight non-crosslinked and/or unsaturated sites are most preferred. The particle size of the polymer products can vary widely depending upon the initial size of the polyvinylpolylactam granules undergoing treatment. Generally an initial particle size of from about 10 to about 400 mesh is employed for treatment.

More specifically, when a mesh screen, for example between about 100 and about 300 mesh, is employed in the clarification of beverages, the average particle size distribution and hardness of the polymer particles should be such that they do not agglomerate or plug the pores of the screen. For such purposes, an average particle size greater than about 200 micrometers is conveniently employed. Conversely, when the filtering means is a membrane having small pore openings, for example between about 1 hour and about 10 micrometers diameter, much smaller particles of the polymer, compatible with the membrane pore size, e.g. 50 micrometers, can be used. Obtaining a specific particle size of the polymer is not a serious consideration in the present invention since larger particles can be produced in any convenient size by well known attrition methods such as grinding, ball milling, high shear mixing, sand milling, etc. The average particle size distribution of product obtained by the present process without further grinding generally passes through a screen of between 10 and 400 mesh.

Many products are marketed commercially which satisfy the requirements for the present insoluble polyvinyl polylactam starting materials of this invention. These include POLYCLAR*, POLYPLASDONE*, and DIVERGAN**. Methods for the preparation of these polymers are also well known. One such method is set forth in U.S. Pat. No. 2,938,017.

*manufactured by GAF Corporation
**manufactured by BASF

According to the present process, polymeric starting materials having a relatively high NVWS content, e.g. above 2%, can be washed with water until the solubles level is reduced to under 1%, preferably under 0.5%. Alternatively the polymer can be treated directly and washed with water after treatment to reduce the solubles level when so required. In certain instances, where the NVWS level is not a consideration, as in non-comestible products, in water clarification or clarification of coating solutions, water washing can be entirely eliminated. Generally, for clarification of beverages or solutions taken internally, a NVWS level of not more than 2%, preferably not more than 1.5%, is required.

Presumably, the ozone used to treat the present polymer particles causes additional crosslinking and/or saturation of unsaturated sites remaining in the polymeric starting material. The granular particles of the starting material are also hardened during the heat treatment so that the finished product has significantly greater resistance to swelling and plugging of a filter caused by gelling.

As indicated above, the granular polyvinyl lactam starting material can be treated in a dry state or it can be treated as a wet water-washed cake. However, the wet filter cake should contain less than 10% water and aqueous suspensions or slurries of the particulate polymer should be avoided. The polymeric material is treated in an open vessel, an autoclave, a heat exchanger, a dry ice cooled container or any other convenient vessel. The ozone treated particulate solids are collected, optionally water washed to remove low molecular weight contaminants and then dried to packaging and use. If desired, the dried particles of 10 to 400 mesh size can be ground to finer size to meet specifications for specialized uses.

For the treatment of beverages, the treated dry particles of this invention can be slurried in water, poured onto a filter to form a filter cake through which the beverage can be filtered at a very high rate, e.g. at a pressure of 2 m water, more than 5 hectaliters/hour can be filtered through a 1 m² bed containing 12.5 Kg/m². Alternatively the beverage or liquid to the clarified may be slurried with the treated polymeric product and then filtered. During this filtration process, anthrocyanogens, natural proteins, tannin protein complexes, tannins and other color or haze forming bodies are removed from the beverage with a higher degree of clarification than has been achieved heretofore at such high filtration rates.

When the filtration rate falls below a predetermined level, the polymeric products are easily regenerated, eg. by washing the filter cake with caustic and then with water until the contaminant level is below about 1%. The clarifying polymeric agent is then ready for reuse. The regeneration process is generally effected at ambient temperature and pressure.

Product testing for FRI is effected as follows. The pressure filter apparatus for the flow rate determination consists of a stainless steel barrel (25 cm long × 50 mm I.D.), filter support (50 mm stainless steel screen with a 3 mm diameter holes) and outlet tube. The filter support is fitted with filter paper (Schleicher and Schuell #589²) before each analysis. The filter apparatus inlet is connected with Tygon tubing to a thermostated (20° C. ±2° C.) water reservoir at a height of 200 cm from the filter support (equivalent to 0.2 bar pressure). A quantity (4.0 g. on a dry basis) of sample, swolen in 200 ml distilled water (20° C.) for 24 hours, is added to the barrel of the filter apparatus. The barrel is reassembled and filled with water. The filter bed is established by allowing 500 ml of pressurized water to pass through the apparatus. The time required for an additional 100 ml of water to pass through the filter bed is used to calculate the FRI $$FRI = \frac{4608}{time\ (sec)}$$

Having thus described the invention, reference is now had to the accompanying examples which are presented to illustrate preferred embodiments but which are not to be construed as limiting to the scope of the invention as more generally described above and in the appended claims.

EXAMPLES 1–11

The initial FRI of 25 g. samples of DIVERGAN R, Example 11, and POLYCLAR ®-AT powder, Examples 1-10 (insoluble polyvinyl polypyrrolidone containing less than 10% non-crosslinked and/or unsaturated sites, having a number average molecular weight above 100,000 and an average particle size of about 40-400 mesh), was measured in the manner described above and the FRI values recorded as is reported in Table I.

Additional duplicate 25 g. samples of each control, in 8 ounce narrow mouth glass jars, were then heated or cooled as shown in Table I and ozone from a micro-ozonizer at a flow rate of 0.3–0.4 milliequivalent/hour and oxygen at a flow rate of 1 SCFH* was introduced below the polymeric granules for a period of 3 hours. The ozone treatment was then discontinued, the FRI of each treated sample was again measured and the values recorded as reported in Table I.

*Standard cubic foot/hr.

TABLE I

| Example No. | FRI Before Ozone Treatment | Temp. °C. | FRI After Ozone Treatment |
|---|---|---|---|
| 1 | 35, 36 | 0 | 102, 102 |
| 2 | 35, 36 | 20–25 | 55, 53 |
| 3 | 35, 36 | 30 | 58, 58 |
| 4 | 35, 36 | 60 | 35, 34 |
| 5 | 35, 36 | 90 | 53, 50 |
| 6 | 38, 42 | 0 | 121, 144 |
| 7 | 38, 42 | 90 | 128, 112 |
| 8 | 18, 19 | 0 | 94, 100 |
| 9 | 18, 19 | 90 | 85, 90 |
| 10 | 154 | 0 | 256, 307 |
| 11* | 45, 50* | 0 | 79, 85 |

*DIVERGAN R, supplied by BASF

EXAMPLE 12

Example No. 4 was repeated except that oxygen at a flow rate of 1 SCFH was substituted for ozone. After treatment with oxygen, the initial FRI was almost unchanged (i.e. Final FRI 29, 26).

FIG. 1 illustrates the criticality of temperature ranges employed for the ozone treatment of a polyvinyl polypyrrolidone having an initial FRI of Example 1. As shown, by ozone treatment at between about −20° C. and 0° C. the initial FRI is increased 4 fold. At temperatures up to about 30° the initial FRI is about doubled. However, at 45°–70° C. FRI increase is negligible. Surprisingly at 80° to 120° C. the FRI is again significantly increased.

What is claimed is:

1. The process of subjecting a normally solid, water insoluble vinyl lactam polymer containing a major amount of monomer having the structure

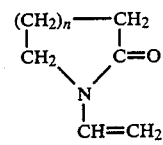

wherein n has a value of 1–3 and having an FRI less than 100 containing not more than a minor amount of non-crosslinked and/or unsaturated sites to contact with ozone at a temperature selected from within the ranges consisting of from about −15° C. to 35° C. and from 85° C. to about 150° C. under a pressure of from about 1 psig. to about 200 psig. for a period of at least 0.1 hour.

2. The process of claim 1 wherein the vinyl lactam polymer is polyvinyl polypyrrolidone is granular form.

3. The process of claim 2 wherein the polyvinyl polypyrrolidone granules containing 0 to 10% water are subjected within the ranges of from about −5° C. to about 30° C. and from about 88° C. to about 100° C. under atmospheric pressure.

4. The process of claim 1 wherein the process is effected in an open vessel and the flow rate of ozone is between about 0.05 and about 1 milliequivalent/hour/Kg of vinyl lactam polymer.

5. The process of claim 4 wherein said vinyl lactam polymer is polyvinyl polypyrrolidone.

6. The process of claim 4 wherein the process is effected in an open vessel and said flow rate of ozone is between about 0.1 and about 0.6 milliequivalent/hour/Kg of vinyl lactam polymer.

7. The process of claim 1 wherein the process is effected in a sealed vessel and between about 5 and about 200 milliequivalents of ozone per Kg of vinyl lactam polymer is employed.

8. The process of claim 7 wherein between about 10 and about 100 milliequivalents of ozone per Kg of vinyl lactam polymer is employed.

9. The process of claim 1 wherein the vinyl lactam polymer as a water-washed filter cake containing up to 10% water is subjected to said treatment.

* * * * *